(12) United States Patent
Shehata et al.

(10) Patent No.: US 10,108,764 B2
(45) Date of Patent: Oct. 23, 2018

(54) POWER CONSUMPTION ESTIMATION METHOD FOR SYSTEM ON CHIP (SOC), SYSTEM FOR IMPLEMENTING THE METHOD

(71) Applicant: TAIWAN SEMICONDUCTOR MANUFACTURING COMPANY, LTD., Hsinchu (TW)

(72) Inventors: Shereef Shehata, San Roman, CA (US); Sandeep Kumar Goel, Dublin, CA (US); Tze-Chiang Huang, Saratoga, CA (US); Yun-Han Lee, Baoshan Township (TW); Mei Wong, Saratoga, CA (US)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 39 days.

(21) Appl. No.: 15/099,941

(22) Filed: Apr. 15, 2016

(65) Prior Publication Data

US 2017/0300604 A1    Oct. 19, 2017

(51) Int. Cl.
G06F 17/50    (2006.01)

(52) U.S. Cl.
CPC ...... *G06F 17/5009* (2013.01); *G06F 2217/66* (2013.01); *G06F 2217/78* (2013.01)

(58) Field of Classification Search
CPC ............. G06F 17/5009; G06F 17/5022; G06F 17/5036; G06F 17/5045; G06F 2217/66; G06F 2217/78
USPC ........................................ 716/106, 109, 133
See application file for complete search history.

(56) References Cited

U.S. PATENT DOCUMENTS

| | | | |
|---|---|---|---|
| 8,434,032 B2 | 4/2013 | Lu et al. |
| 8,601,416 B2 | 12/2013 | Kuo et al. |
| 8,762,900 B2 | 6/2014 | Shin et al. |
| 8,775,993 B2 | 7/2014 | Huang et al. |
| 8,887,116 B2 | 11/2014 | Ho et al. |
| 8,943,445 B2 | 1/2015 | Chen et al. |
| 8,990,762 B2 | 3/2015 | Yuh et al. |
| 9,081,933 B2 | 7/2015 | Liu et al. |
| 9,183,341 B2 | 11/2015 | Chen et al. |
| 9,213,790 B2 | 12/2015 | Hsu et al. |
| 2014/0237435 A1 | 8/2014 | Chen et al. |

(Continued)

*Primary Examiner* — Paul Dinh
(74) *Attorney, Agent, or Firm* — Hauptman Ham, LLP (57) ABSTRACT

A method of estimating power consumption for a system on chip (SOC) includes simulating operation of a first sub-block to obtain power consumption information for the first sub-block including first activation information for a first IP block. The method further includes simulating operation of a second sub-block to obtain power consumption information for the second sub-block including second activation information for the first IP block and activation information for a plurality of second IP blocks. The method further includes determining a weighting factor for the first activation information for the first IP block, the second activation information for the first IP block and the activation information for each second IP block. The method further includes estimating power consumption for the SOC based on the first and second activation information for the first IP block, the activation information for at least one second IP block, and corresponding weighting factors.

20 Claims, 9 Drawing Sheets

(56) References Cited

U.S. PATENT DOCUMENTS

| | | |
|---|---|---|
| 2014/0304670 A1 | 10/2014 | Su et al. |
| 2015/0278419 A1 | 10/2015 | Yang et al. |
| 2015/0370937 A1 | 12/2015 | Liu et al. |
| 2015/0370945 A1 | 12/2015 | Lee |
| 2017/0091357 A1* | 3/2017 | Brock ................. G06F 17/5009 |
| 2017/0235856 A1* | 8/2017 | Haridass ............. G06F 17/5009 703/18 |

* cited by examiner

POWER CONSUMPTION ESTIMATION METHOD FOR SYSTEM ON CHIP (SOC), SYSTEM FOR IMPLEMENTING THE METHOD

BACKGROUND

System on chips (SOCs) include multiple different sub-blocks connected together to perform a function. At least one sub-block is designed to perform a different function from another sub-block of an SOC. During an SOC design process, the sub-blocks are designed in order to perform a desired function. In some instances, the sub-block designs are called intellectual property (IP) blocks or cell designs. These IP blocks or cell designs are stored in a cell library for use by a designer during the SOC design process.

Power consumption for the IP blocks is generally divided into two categories. A power state category includes IP blocks which have a power consumption based on a power state of the IP block. For example, during an operating mode the IP block will consume a first amount of power; while during a sleep mode the IP block will consume a different amount of power. Power consumption for IP blocks in the power state category is typically independent from operation of other IP blocks in the SOC.

A programmable processor category includes IP blocks which have a power consumption base on a specific program being executed by the IP block. For example, during an operation state the IP block executes a first program and has a first power consumption; while the same IP block executing a second program during the operation state has a different power consumption. The power consumption of IP blocks within the programmable processor category depends on more than a power state of the SOC.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Estimating power consumption for an SOC helps to determine whether the SOC satisfies power budget constraints or helps to determine a storage capacity of a battery for a device. In many devices, a size of the battery is a major component in determining a size of the overall device. In addition, consumers prefer longer battery life to maximize usefulness of the device. Accurately determining power consumption for the SOC assists the designer in balancing a desire for smaller device sizes while maximizing useful battery life of the device.

In most situations, power consumption for power state IP blocks within the SOC is predictable because the power consumption is determinable independent of operation of a specific program or interactions between different IP blocks within the SOC design. However, power consumption for programmable processor IP blocks is more difficult because the power consumption varies with both a specific program being executed as well as with interaction between different IP blocks within the SOC design.

In addition to accuracy in determining power consumption, speed of estimating the power consumption helps to reduce the amount of time between conception of a device and production of a device. Once a device idea is generated, the device is designed to satisfy the desired functional goals. Part of this design process includes determining a power budget for the device to function as intended for a desired amount of time. The amount of power (power budget) is determined by power consumption estimations for the device. In some instances, a power consumption estimation is not satisfactory and the design of the device is revised to change the power consumption of the device. In some embodiments, revising the device design includes revising the SOC. In some embodiments, revising the device design includes adjusting a storage capacity of a battery in the device. This power consumption estimation and design revision cycle is repeated many times in some situations. Reducing an amount of time for each cycle will assist in beginning production of the device sooner in comparison with a design process having longer cycle times.

In some embodiments, power consumption is estimated by simulating a number of actuations within sub-blocks of the SOC using activity counters. In some embodiments, a sub-block includes one IP block. In some embodiments, a sub-block includes a plurality of IP blocks. An activity counter counts a number of activations of a certain portion of the sub-block during a simulation of operation of the SOC. By combining a number of activations with an amount of power consumed for each activation, an estimated power consumption for a sub-block is determined, in some embodiments.

Figure 1:
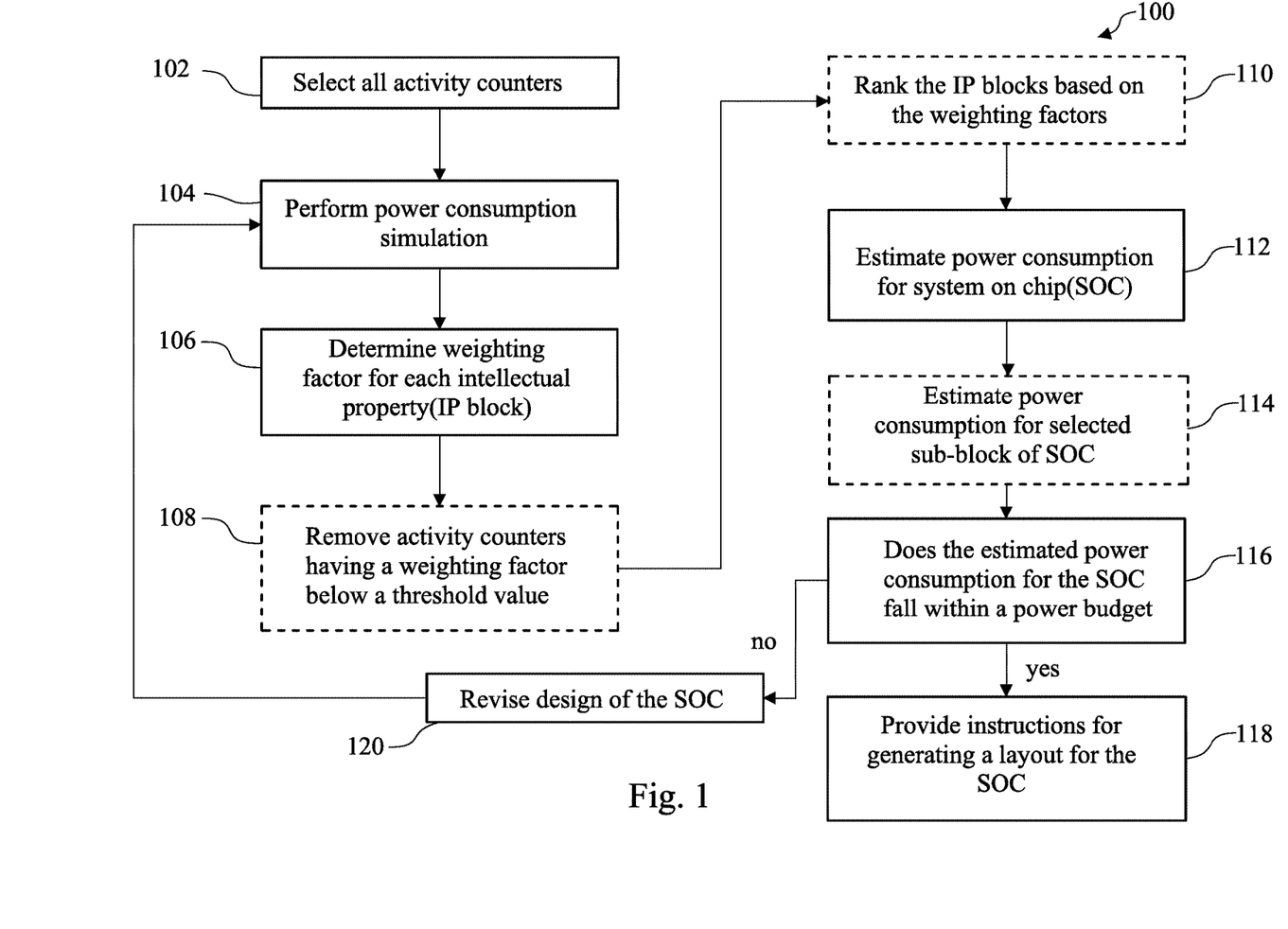
FIG. 1 is a flowchart of a method of estimating power consumption for a system on chip (SOC) in accordance with some embodiments.

FIG. 1 is a flowchart of a method 100 of estimating power consumption for a system on chip (SOC) in accordance with some embodiments. In operation 102, all activity counters within every sub-block of the SOC are selected. Selecting an activity counter means that the activity counter is taken into consideration during simulation of the SOC or the sub-block. The activity counters are selected in every sub-block of the SOC in order to provide an accurate estimation of the power consumption of the SOC. In some instances, activation of an IP block within one sub-block of the SOC will result in power consumption in a separate sub-block of the SOC. For example, if a first sub-block reads data from a memory in a second sub-block, power is consumed in both the first sub-block and the second sub-block. In approaches which do not account for activity counters in every sub-block, power consumption resulting from activities in separate sub-blocks is not included in the estimation and increases an error between the estimation and an actual power consumption.

Low accuracy in power consumption estimation potentially causes over design of the SOC or of a battery. For example, if an estimate is known to have a high error, a designer will select a battery size for the device which accounts for the error. In order to help ensure a properly functioning device, the designer will select a battery size which is greater than known error to account for additional unknown errors in the power consumption estimation. In some instances, low accuracy in power consumption estimation potentially increases the amount of time between conception and production because the designer is unable to clearly identify where power is being consumed in the SOC when different programs are executed. In such situations, the designer will spend time attempting to optimize a portion of the SOC which has little or no impact on overall power consumption of the SOC.

In operation 104, a power consumption simulation is performed for the SOC using a simulation tool. The simulation tool is a special purpose computer configured to execute instructions for determining an amount of power consumed by operation of the SOC. The power consumption is determined based on a number of activations determined by each of the activity counters within a plurality of sub-blocks multiplied by a weighting factor for each activity counter. The weighting factor accounts for relative power consumption during an activation of the IP block associated with a specific activity counter. In some embodiments, the power consumption is determined based on a number of activations determined by less than all of the activity counters within the plurality of sub-blocks. For example, in some embodiments, a first activity counter in one sub-block will be considered during the power consumption simulation while a second activity counter within the same sub-block is not considered during the power consumption simulation. In some embodiments, the plurality of sub-blocks in the simulation is all of the sub-blocks. In some embodiments, the plurality of sub-blocks in the simulation is less than all of the sub-blocks. For example, in some embodiments, not all activity counters within a specific sub-block are considered during the power consumption simulation.

In operation 106, a weighting factor is determined for each IP block within the SOC for the plurality of sub-blocks. The weighting factor is determined based on the number of activations recorded by the corresponding activity counter and an amount of power consumed by each activation of the IP block associated with the corresponding activity counter. Examples of graphs including weighting factors for activity counters are provided in FIGS. 3A-3E below.

In optional operation 108, IP blocks having a weighting factor below a threshold value are removed from the power consumption estimation. Removing activity counters from the power consumption estimation which have a low impact on the overall power consumption estimation helps to increase a speed of determining the power consumption estimation for the SOC. However, removing the activity counters from the power consumption estimation which have a low impact on the overall estimation decreases an accuracy of the power consumption estimation.

A degree of accuracy reduction and increase in speed of estimation are related to a value of the threshold value. A higher threshold value has a lower degree of accuracy and a higher degree of speed of estimation. A lower threshold value has a higher degree of accuracy and a lower degree of speed of estimation. In some embodiments, the threshold value is selected by the designer. In some embodiments, the threshold value is recommended by the simulation tool based on an acceptable error received from the designer. In some embodiments, a threshold value is a same value for every sub-block of the SOC. In some embodiments, a threshold value for one sub-block of the SOC is different from a threshold value for at least one other sub-block of the SOC. An acceptable error is an acceptable difference between the power consumption estimation and the actual power consumption of the SOC. The acceptable error is selected to provide flexibility in the design of the SOC, to reduce an amount of time consumed during design of the SOC and/or help avoid overdesign of the SOC. In some embodiments, the acceptable error is called a predetermined error value.

In some embodiments, optional operation 108 is omitted. Optional operation 108 is omitted if a highest degree of accuracy of the power consumption estimation is desired. In some embodiments, operation 108 is omitted for one sub-block and utilized for another sub-block. If optional operation 108 is omitted method 100 proceeds from operation 106 to operation 110.

In optional operation 110, the IP blocks are ranked based on the weighting factors. Ranking the IP blocks helps a designer to identify which portions of the SOC have a greatest impact on power consumption. By identifying which portions of the SOC have a greatest impact on power consumption, the designer is able to target efforts to reducing power consumption to IP blocks which will have a greatest impact on the SOC overall. In some embodiments, the ranked IP blocks are stored in a table. In some embodiments, the ranked IP blocks are displayed to the designer. In some embodiments, the ranked IP blocks are highlighted in a design provided to the designer.

In some embodiments, optional operation 110 is omitted. Optional operation 110 is omitted if specified by the designer, in some embodiments. In some embodiments, operation 110 is omitted for one sub-block and utilized for another sub-block. If optional operation 110 is omitted method 100 proceeds from operation 108 to operation 112. If optional operation 108 and optional operation 110 are both omitted method 100 proceeds from operation 106 to operation 112.

In operation 112, a power consumption estimation for the SOC is determined. The power consumption estimation for the SOC is determined based on a summation of the results of the power consumption estimation for each IP block in every sub-block multiplied by a corresponding weighting factor. The weighting factor helps to account for relative power consumption between different IP blocks. For example, if one IP block consumes twice as much power as another IP block, treating these two IP blocks equally for determination of the power consumption of the SOC will decrease accuracy of the power consumption estimation for the SOC. In some embodiments, the power consumption estimation for the SOC is provided by a formula:

$$PEsoc = \sum_{j=1}^{nk} Ck, j*Wkk, j + \sum_{j=1}^{nk} Cl, j*Wlk, j + Ksoc$$

where PEsoc is a power consumption estimation of the SOC; C is a number of activations by an IP block as determined by a corresponding activity counter; W is a weighting factor for the corresponding IP block; j represents a number identifying a counter within a sub-block; k and l represent a number identifying a specific sub-block; and Ksoc is an inherent amount of power consumption for the SOC regardless of a number of activations for IP blocks. The two summations in the above formula indicate that power consumption from each activity counter within both sub-blocks is considered during estimation of the power consumption. In some embodiments, additional summations are included as a number of sub-blocks in the SOC increases.

In some embodiments where operation 108 is included in method 100, less than all of the IP blocks are considered during estimation of power consumption for the SOC. In some embodiments where operation 108 is included in method 100, less than all of the sub-blocks are considered during estimation of power consumption for the SOC.

Results of the power consumption estimation of the SOC are stored for comparison with other power consumption estimations. In some embodiments, the results of the power consumption estimation for a first SOC are compared with results of the power consumption estimation for a second SOC for performing a same function as the first SOC but having a different architecture. In some embodiments, the results of the power consumption estimation for the SOC are stored within the simulation tool. In some embodiments, the results of the power consumption estimation are stored in a computer readable medium accessible by the simulation tool.

In optional operation 114, a power consumption estimation for a selected sub-block is determined. The power consumption estimation for the selected sub-block is determined based on a summation of the results of the power consumption estimation for each IP block in every sub-block multiplied by a corresponding weighting factor. The formula for determining the power consumption for a sub-block is similar to the formula for determining the power consumption for the SOC; however, the inherent amount of power consumption is different and/or the weighting factors associated with a specific activity counter is different, in some embodiments. In some embodiments, the power consumption estimation for the sub-block is provided a formula:

$$PEsb = \sum_{j=1}^{nk} Ck, j*Wkk, j + \sum_{j=1}^{nk} Cl, j*Wlk, j + Kk$$

where PEsb is a power consumption estimation of the sub-block; C is a number of activations by an IP block within the sub-block; W is a weighting factor for the corresponding IP block; j represents a number identifying a counter within a sub-block; k and l represent a number identifying a specific sub-block; and Kk is an inherent amount of power consumption for the sub-block regardless of a number of activations. The two summations in the above formula indicate that power consumption from each activity counter within both sub-blocks is considered during estimation of the power consumption. In some embodiments, additional summations are included as a number of sub-blocks in the SOC increases.

Power consumption is estimated for each sub-block using a same strategy as estimating power consumption for the SOC. Activation of IP blocks in every sub-block is considered. A difference between estimating power consumption for a sub-block and power consumption for the SOC is based on the weighting factors. For a sub-block where a majority of power consumption occurs within the sub-block, i.e., power consumption in separate sub-blocks is minimal; the weighting factor for internal IP blocks will be large. However, for the SOC the same sub-block may only be a minor source of power consumption, so the weighting factor for the same internal IP block will be lower for the SOC than for the sub-block.

Results of the power consumption estimation of the sub-block are stored for determining a power consumption estimation of the SOC. In some embodiments, the results of the power consumption estimation for a first sub-block are compared with results of the power consumption estimation for a second sub-block for performing a same function as the first sub-block but having a different architecture. Comparing the power consumption estimation for different sub-blocks helps the designer determine whether replacing one sub-block with another will improve power consumption of the SOC. In some embodiments, the results of the power consumption estimation for the sub-block are stored within the simulation tool. In some embodiments, the results of the power consumption estimation are stored in a computer readable medium accessible by the simulation tool.

In some embodiments, operation 114 is omitted where the designer is focused on obtaining a power consumption estimation for the SOC without considering power consumption of individual sub-blocks. In some embodiments where operation 114 is omitted, method 100 proceeds from operation 112 to operation 116.

In operation 116, the power consumption estimation for the SOC is compared with a power budget for the SOC. In some embodiments, the power budget is provided by the designer. In some embodiments, the power budget is extracted from information stored in the design of the SOC.

If the power consumption estimation for the SOC satisfies the power budget for the SOC, method 100 proceeds to operation 118. In operation 118, instructions are generated for designing a layout of the SOC. Following generation of the layout for the SOC, the SOC is manufactured to produce a component of the device.

If the power consumption estimation for the SOC fails to satisfy the power budget for the SOC, the method proceeds to operation 120. The power consumption estimation fails to satisfy the power budget for the SOC if the power consumption estimation indicates that the SOC will consume more power than allotted by the design of the device including the SOC. In some embodiments, the power consumption estimation is deemed to fail to satisfy the power budget if a difference between the power consumption estimation and the allotted amount of power is below the allotted amount of power reduced by a power buffer. The power buffer helps to account for errors in the power consumption estimation to help ensure that the device functions as intended. In operation 120, the design of the SOC is revised. In some embodiments, the designer makes revisions to the design of the SOC. In some embodiments, a simulation tool provides recommendations for revisions to the design of the SOC. In some embodiments, the revisions to the design of the SOC are based on a ranking of the IP blocks from operation 110.

For example, in some embodiments, the revision of the design of the SOC focuses on IP blocks which have a most significant impact on power consumption for the SOC.

In some embodiments, the SOC includes a graphical processing unit (GPU), a central processing unit (CPU) having multiple processing cores, a digital signal processor (DSP), or other suitable SOCs. In some embodiments, the sub-blocks include a shader cluster, shader blocks, a shader register storage, a GPU pixel processing unit, a GPU rasterization unit, a GPU texture filter, or another suitable sub-block.

In comparison with other approaches which do not consider interaction of IP blocks between separate sub-blocks, method 100 provides increased accuracy. For example, in comparison with a linear regression power consumption estimation approach a maximum error of method 100 is significantly reduced. Table 1 below provides a comparison between a maximum error of a linear regression power consumption estimation approach and a maximum error of method 100 where all IP blocks are considered.

TABLE 1

| Sub-Block Type | Multiple Linear Regression (max error %) | Method 100 (max error %) |
| --- | --- | --- |
| Shader Cluster | 7 | 3 |
| Shader Blocks | 15 | 2 |
| Shader Register Storing | 50 | 4 |
| GPU Pixel Processing Unit | 27 | 3 |
| GPU Rasterization Unit | 52 | 2.5 |
| GPU Texture Filter | 26 | 1 |

By increasing accuracy in the power consumption estimation, i.e., reducing a maximum error, designers are able to precisely determine whether the SOC satisfies a power budget or select a battery for inclusion with a device with a reduced risk of the device functioning improperly. Accurate determination of the performance of the SOC reduces design time and avoids over designing of the SOC. In addition, a size or material of the battery is selectable without a need to consider large potential errors in the power consumption estimation, i.e., over design of the battery is reduced.

Figure 2:
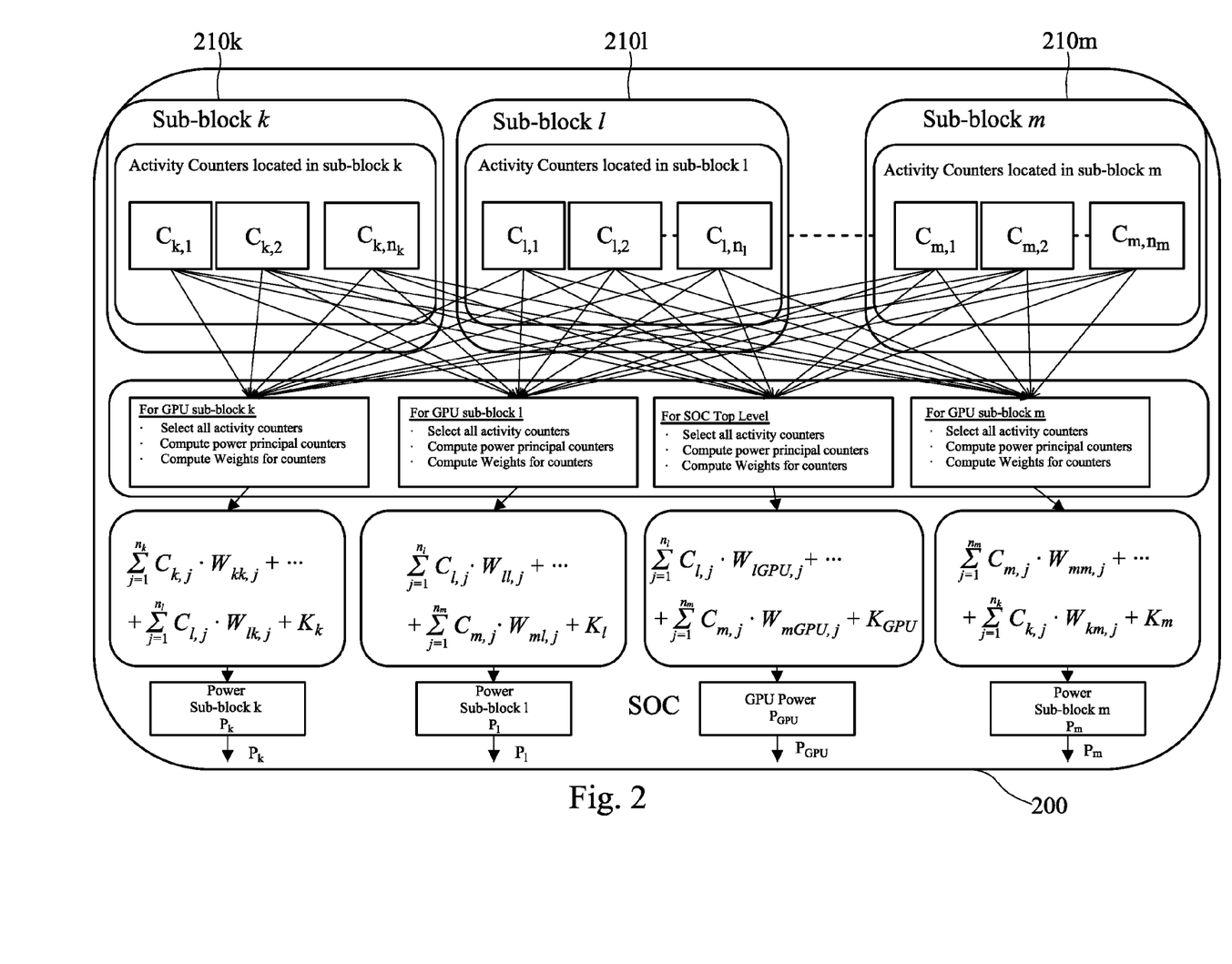
FIG. 2 is a block diagram of an SOC indicating information and calculation used during the method of FIG. 1 in accordance with some embodiments.

FIG. 2 is a block diagram of an SOC 200 indicating information and calculations used during method 100 in accordance with some embodiments. SOC 200 includes sub-blocks 210$k$, 210$l$ and 210$m$. In some embodiments, SOC 200 is a GPU and sub-blocks 210$k$-210$m$ are GPU sub-blocks. In some embodiments, SOC 200 is different from a GPU and includes sub-blocks other than GPU sub-blocks. Sub-block 210$k$ includes activity counters $C_{k,1}$-$C_{k,nk}$. Sub-block 210$l$ includes activity counters $C_{1,1}$-$C_{1,n1}$. Sub-block 210$m$ includes activity counters $C_{1,m}$-$C_{1,nm}$. The activity counters $C_{k,1}$-$C_{k,nk}$; $C_{1,1}$-$C_{1,n1}$; and $C_{1,m}$-$C_{1,nm}$ track a number of activations of a corresponding IP block within a sub-block during simulation of SOC 200.

As indicated in FIG. 2, a power consumption estimation for SOC 200 considers information from each activity counter $C_{k,1}$-$C_{k,nk}$; $C_{1,1}$-$C_{1,n1}$; and $C_{1,m}$-$C_{1,nm}$ within the SOC. A weighting factor, which represents a relative importance of the IP block corresponding to each activity counter for determining power consumption for SOC 200, is combined with the information from the activity counters to determine the overall power consumption of the SOC. The power consumption estimation for SOC 200 is able to be performed independently from estimation of power consumption for any sub-block of SOC 200. For example, in some embodiments, the power consumption for SOC 200 is estimated prior to estimating a power consumption for at least one sub-block 210$k$-210$m$. In some embodiments, the power consumption for SOC 200 is estimated simultaneously with estimating power consumption for at least one of sub-blocks 210$k$-210$m$. In some embodiments, at least one IP block is excluded from consideration during estimation of the power consumption of SOC 200 based on the corresponding weighting factor.

As indicated in FIG. 2, a power consumption estimation for sub-block 210$k$ takes information from all activity counters into consideration including activity counters in sub-block 210$l$ and sub-block 210$m$. A weighting factor, which represents a relative importance of the IP block corresponding to each activity counter for determining power consumption for sub-block 210$k$, is combined with the information from the activity counters to determine the overall power consumption of the sub-block 210$k$. The weighting factor applied to the estimation of power consumption for sub-block 210$k$ is different from the weighting factor applied to the estimation of power consumption for SOC 200 because a contribution of an IP block to the power consumption of sub-block 210$k$ is different from the contribution of the IP block to the power consumption of SOC 200, in some instances.

The power consumption estimation for sub-block 210$k$ is able to be performed independently from estimation of power consumption for SOC 200 or any other sub-block of SOC 200. For example, in some embodiments, the power consumption for sub-block 210$k$ is estimated after estimating a power consumption for SOC 200. In some embodiments, the power consumption for sub-block 210$k$ is estimated simultaneously with at least one other sub-block 210$l$ or 210$m$. In some embodiments, at least one IP block is excluded from consideration during estimation of the power consumption of sub-block 210$k$ based on the corresponding weighting factor.

A power consumption estimation for each of sub-block 210$l$ and sub-block 210$m$ considers all activity counters in each of sub-blocks 210$k$-210$m$ in a manner similar to that described above with respect to sub-block 210$k$.

Figure 3A:
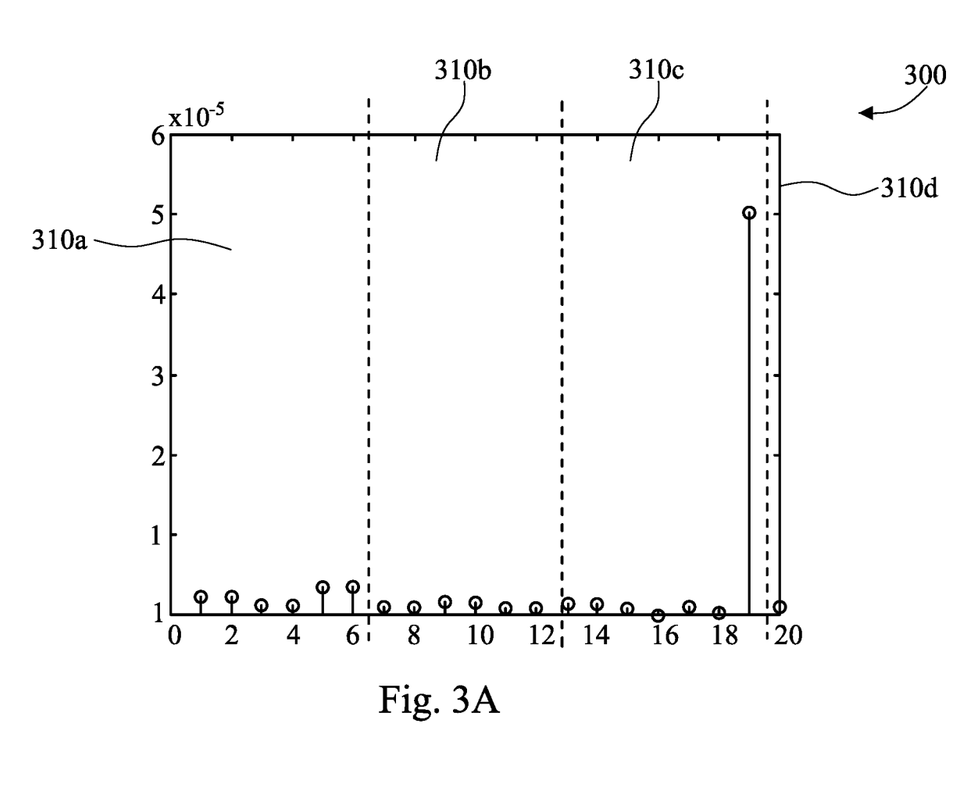
FIGS. 3A-3E are graphs of activity counter weights for an SOC during simulation of a sub-block in accordance with some embodiments.

FIG. 3A is a graph 300 of activity counter weights for an SOC during simulation of a sub-block in accordance with some embodiments. The SOC associated with graph 300 includes twenty activity counters. In some embodiments, a number of activity counters for the SOC is more or less than twenty. The SOC associated with graph 300 includes four sub-blocks 310$a$-310$d$. In some embodiments, a number of sub-blocks of the SOC is more or less than four.

Graph 300 indicates activity counter weights for the SOC during simulation of sub-block 310$c$. The activity counter weights in graph 300 are usable during estimation of power consumption of the SOC when combined with a number of IP block activations detected by a corresponding activity counter.

In some embodiments, information obtainable from graph 300 is used in operation 108 and/or operation 110 of method 100 (FIG. 1). An activity counter weight of activity counter 19, within sub-block 310$c$, in graph 300 is significantly greater than an activity counter weight of any other activity counter in graph 300. In some embodiments, activity counter 19 is considered to be a principal activity counter of the sub-block associated with graph 300. In some embodiments of method 100, IP blocks corresponding to activity counters other than principal activity counters are excluded from consideration of the power consumption estimation in operation 108.

Sub-block 310c is an example of a sub-block where local activity dominates power consumption, i.e., the activity counter weight for activity counters within the sub-block 310c are significantly higher than other activity counters. In some embodiments, if a sub-block is determined to have locally dominated power consumption, method 100 (FIG. 1) discards information from activity counters outside the sub-block during estimation of power consumption of the sub-block during operation 114.

Figure 3B:
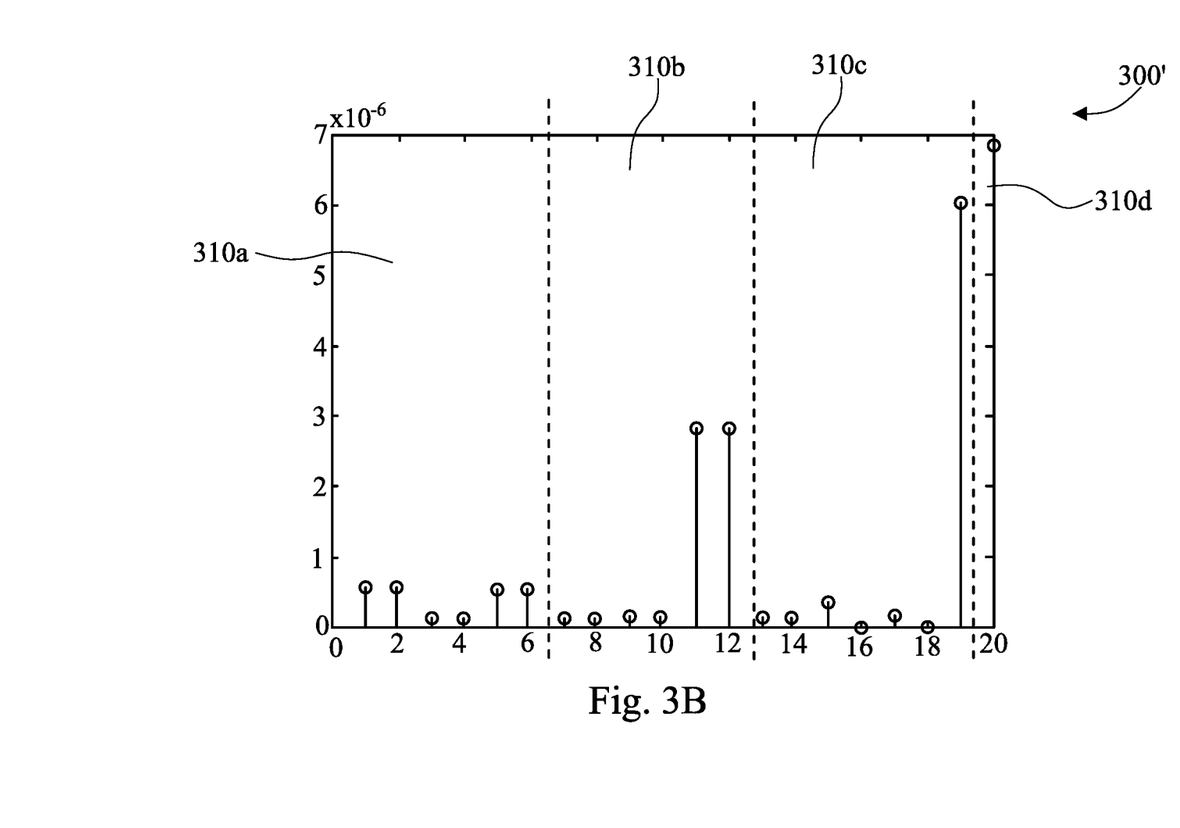

FIG. 3B is a graph 300' of activity counter weights for an SOC during simulation of a sub-block in accordance with some embodiments. The sub-blocks associated with graph 300' are the same sub-blocks associated with graph 300. Graph 300' indicates power consumption for sub-block 310d. Unlike graph 300, graph 300' indicates that IP blocks corresponding to activity counters in external sub-blocks, i.e., sub-blocks 310a-310c, provide a noticeable contribution to power consumption during simulation of sub-block 310d. For example, activity counters 1, 2, 5 and 6 in sub-block 310a have an activity counter weight indicating a non-trivial amount of power consumption contributed by sub-block 310a during simulation of operation for sub-block 310d. A distinction between an activity counter weight indicating a non-trivial amount of power consumption and an activity counter weight indicating a trivial amount of power consumption is described below with respect to threshold value 320 in FIG. 3C. Similarly, activity counters 11 and 12 in sub-block 310b; and activity counter 19 in sub-block 310c also contribute to power consumption during simulation of operation for sub-block 310d.

The simulation of sub-block 310d in graph 300' is an example where considering only activity within sub-block 310d will result in a larger error between an estimated power consumption for the SOC and an actual power consumption of the SOC than the approach in method 100. Utilizing method 100, which considers contributions to power consumption in multiple sub-blocks, will reduce an error for the estimated power consumption for the SOC in comparison with other approaches which only consider activity counters within sub-block 310d.

In some embodiments, information obtainable from graph 300' or the data supporting graph 300' is usable during operation 108 or operation 110 of method 100 (FIG. 1). For example, during operation 110, where activity counters are ranked, the designer would be able to use the information from graph 300' to identify which IP blocks have the most significant contributions to power consumption of the SOC. This information helps the designer focus any design revision efforts on portions of the SOC which will produce more substantial impact. For example, if the designer attempts to optimize power consumption in an IP block associated with activity counter 3 in the SOC associated with graph 300', the time invested by the designer will produce minimal impact on the overall power consumption of the SOC. In contrast, optimization of the power consumption for the IP block associated with activity counter 12 will provide greater impact than with respect to activity counter 3 in the overall power consumption of the SOC.

Figure 3C:
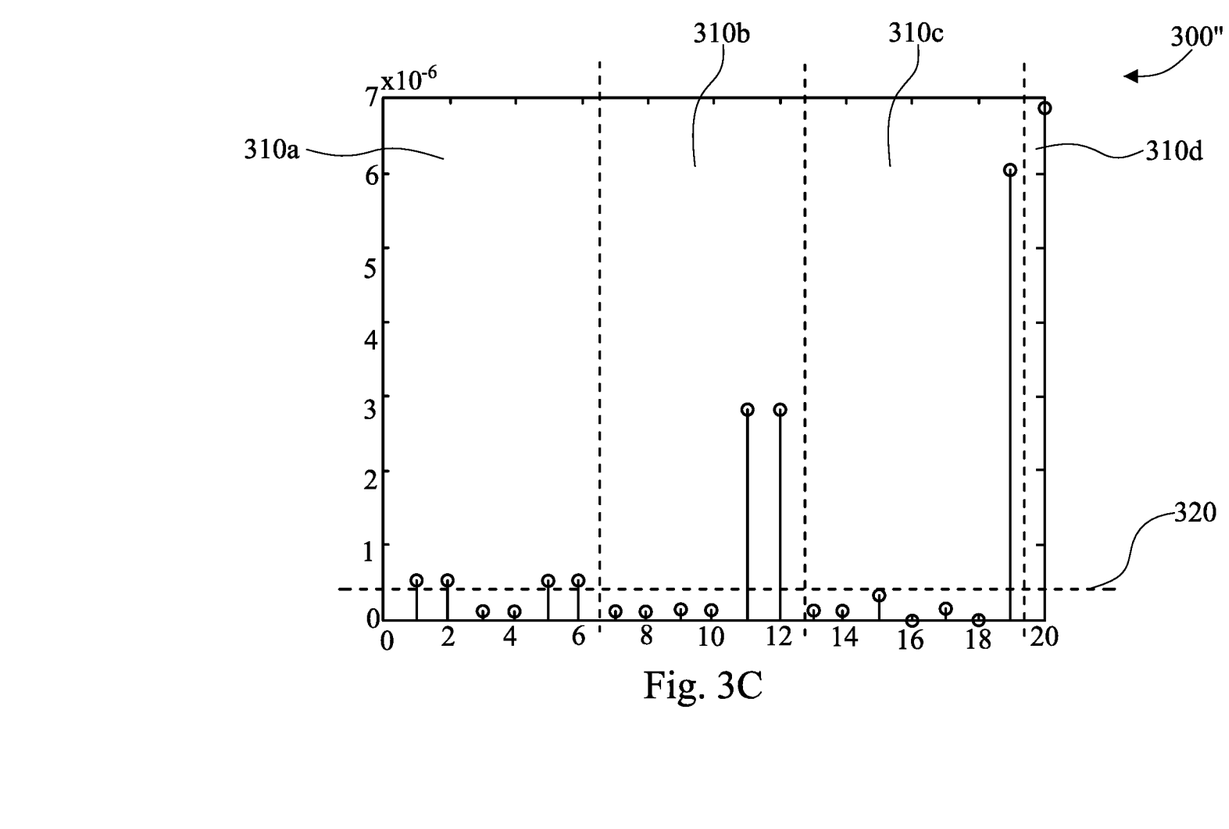
Figure 3D:
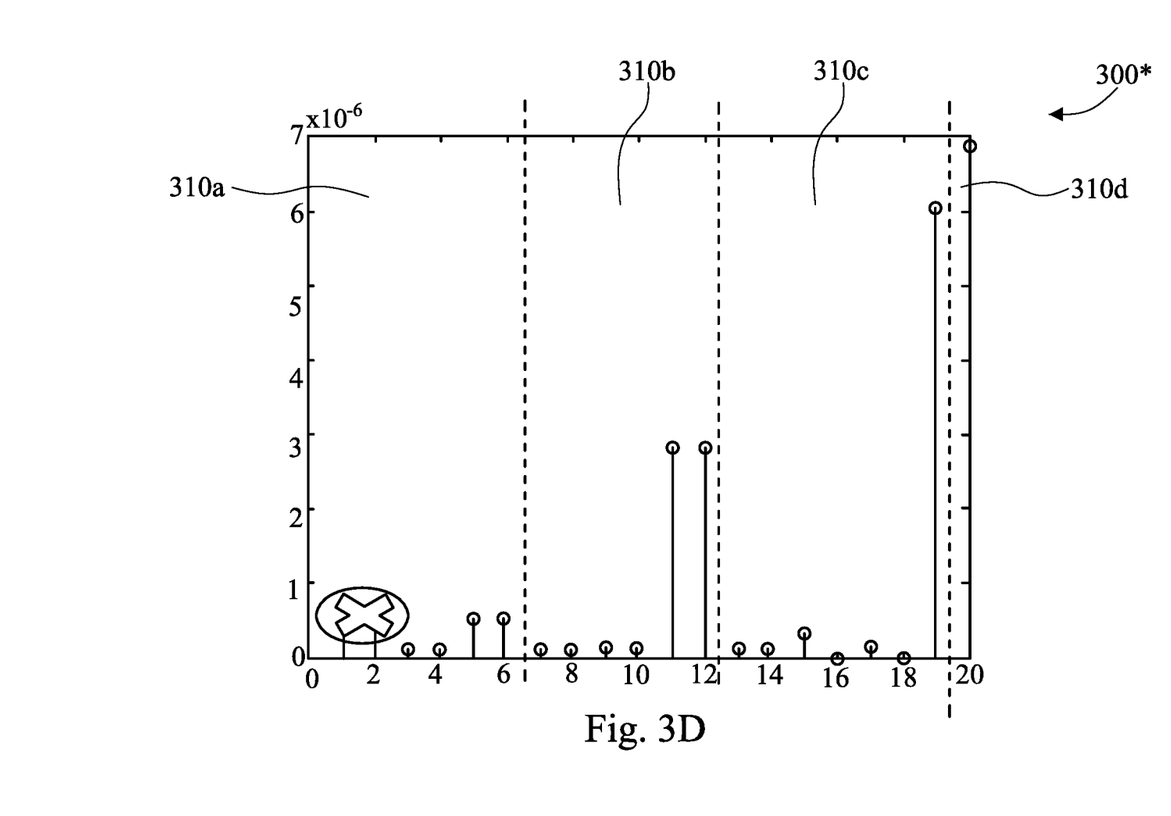
Figure 3E:
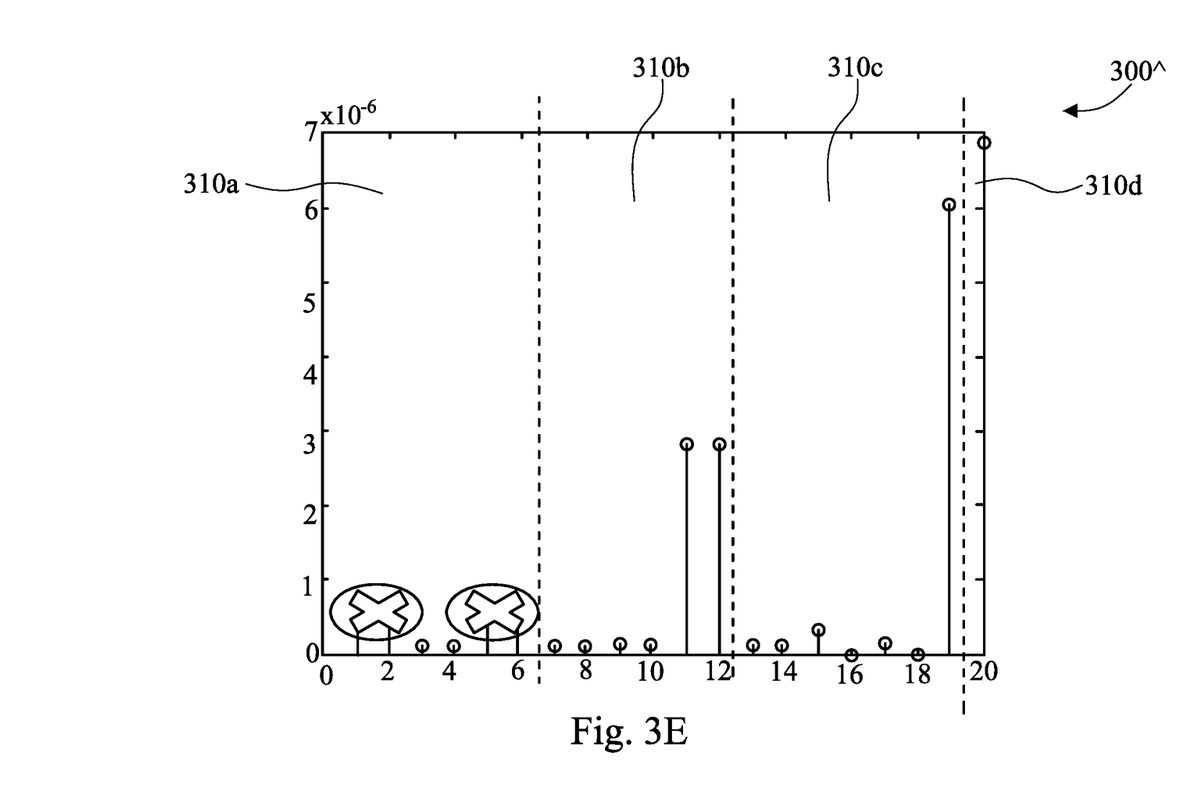

FIGS. 3C-3E help clarify how optional operations 108 and 110 of method 100 (FIG. 1) are usable to reduce an amount of time used to revise a design of the SOC.

FIG. 3C is a graph 300" of activity counter weights for an SOC during simulation of sub-block 310d in accordance with some embodiments. The sub-blocks associated with graph 300" are the same sub-blocks associated with graph 300. In comparison with graph 300', graph 300" includes a threshold value 320. Threshold value 320 is usable with operation 108 of method 100 (FIG. 1). In order to reduce an amount of time for revising the design of the SOC and estimating the power consumption for the SOC, IP blocks associated with activity counters having an activity counter weight below threshold value 320 are pruned from the power consumption estimation for the SOC.

In some embodiments, threshold value 320 is selected based on an acceptable error in the power consumption estimation. In some embodiments, the acceptable error is 1% or less. In some embodiments, the acceptable error is 2% or less. In some embodiments, the acceptable error is 5% or less. In some embodiments, the acceptable error includes values greater than 5%. The acceptable error is defined to balance the accuracy of the power consumption estimation with an amount of time used to determine the power consumption estimation and revise the design of the SOC. A lower acceptable error increases accuracy of the power consumption estimation, but also increases the amount of time to determine the power consumption estimation and revise the design of the SOC. A higher acceptable error reduces accuracy of the power consumption estimation, but also decreases the amount of time to determine the power consumption estimation and revise the design of the SOC.

In the example of graph 300", threshold value 320 prunes IP blocks associated with activity counter 3, 4, 7-10 and 13-18. As a result, in some embodiments, an error of the power consumption estimation for graph 300" is approximately 2.5% in comparison with an error for graph 300', which considers all IP blocks, of approximately 1.5%. This small increase in error rate is offset by reducing the number of IP blocks used in the power consumption estimation by more than half.

FIG. 3D is a graph 300* of activity counter weights for an SOC during simulation of sub-block 310d in accordance with some embodiments. The sub-blocks associated with graph 300* are the same sub-blocks associated with graph 300. In comparison with graph 300' and graph 300", graph 300* indicates that IP blocks associated with activity counters 1 and 2 are pruned. Pruning the IP blocks associated with activity counters 1 and 2 has a larger impact on the error than the pruning indicated in graph 300". For example, in some embodiments, an error of the power consumption estimation for graph 300*, which prunes only IP blocks associated with activity counters 1 and 2, is approximately 5%; with reduced time savings compared with graph 300" because only two IP blocks are removed from consideration. The difference in the error between the pruning indicated in graph 300* and graph 300" provides evidence that considering the power consumption contribution for each sub-block during simulation for any single sub-block helps to provide a more accurate power consumption estimation for the SOC.

FIG. 3E is a graph 300^ of activity counter weights for an SOC during simulation of sub-block 310d in accordance with some embodiments. The sub-blocks associated with graph 300^ are the same sub-blocks associated with graph 300. In comparison with graph 300' and graph 300", graph 300^ indicates that IP blocks associated with activity counters 1, 2, 5 and 6 are pruned. Pruning the IP blocks associated with activity counters 1, 2, 5 and 6 has a larger impact on the error than the pruning indicated in graph 300" or in graph 300*. For example, in some embodiments, an error of the power consumption estimation for graph 300^, which prunes only IP blocks associated with activity counters 1, 2, 5 and 6, is approximately 8.5%; with reduced time savings compared with graph 300" because only four IP blocks are removed from consideration.

Figure 4:
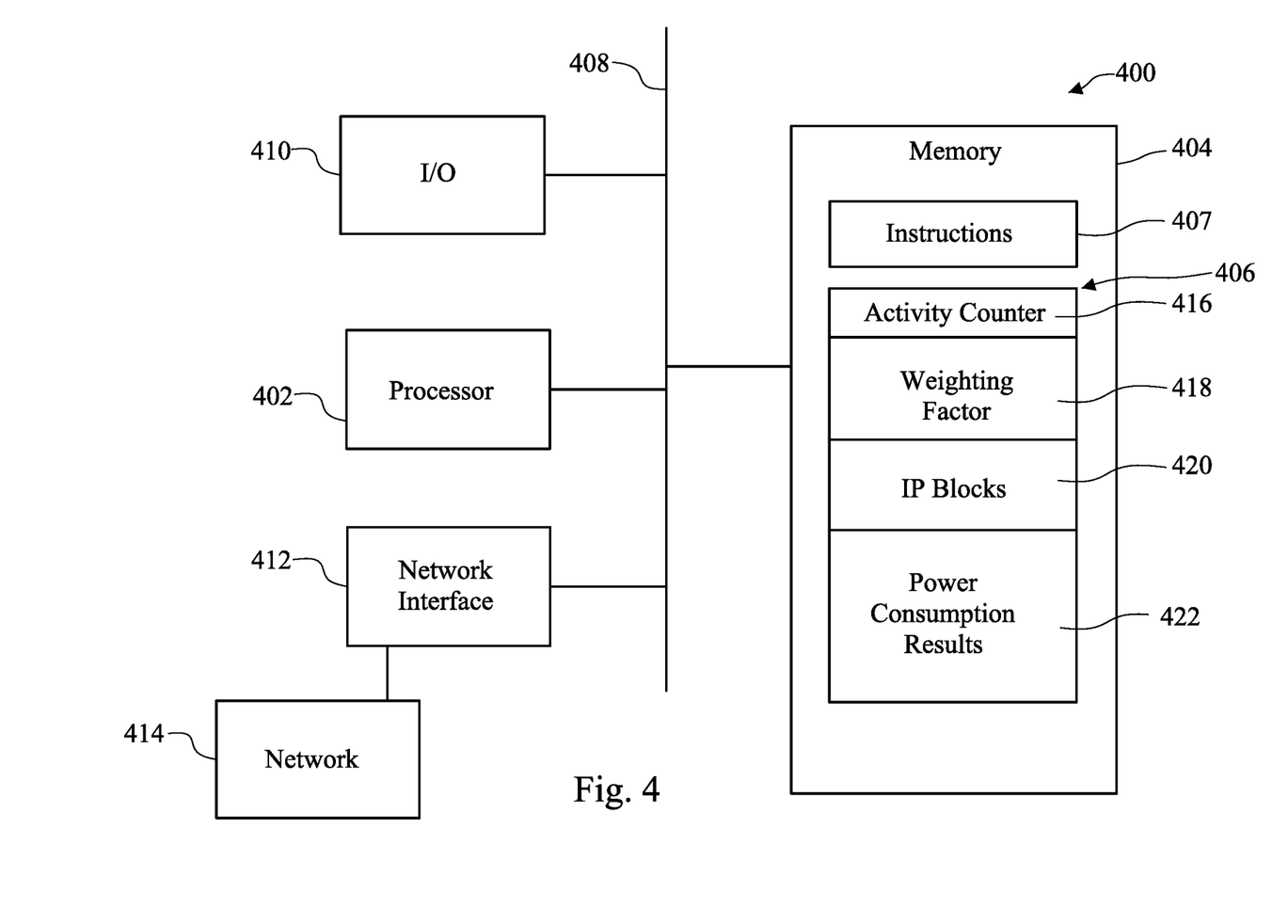
FIG. 4 is a block diagram of a system for implementing a method of estimating power consumption for an SOC in accordance with some embodiments.

FIG. 4 is a block diagram of a system 400 for implementing a method of estimating power consumption for an SOC in accordance with some embodiments. System 400 includes a hardware processor 402 and a non-transitory, computer readable storage medium 404 encoded with, i.e., storing, the computer program code 406, i.e., a set of executable instructions. Computer readable storage medium 404 is also encoded with instructions 407 for interfacing with manufacturing machines for producing the memory array. The processor 402 is electrically coupled to the computer readable storage medium 404 via a bus 408. The processor 402 is also electrically coupled to an I/O interface 410 by bus 408. A network interface 412 is also electrically connected to the processor 402 via bus 408. Network interface 412 is connected to a network 414, so that processor 402 and computer readable storage medium 404 are capable of connecting to external elements via network 414. The processor 402 is configured to execute the computer program code 406 encoded in the computer readable storage medium 404 in order to cause system 400 to be usable for performing a portion or all of the operations as described in method 100.

In some embodiments, the processor 402 is a central processing unit (CPU), a multi-processor, a distributed processing system, an application specific integrated circuit (ASIC), and/or a suitable processing unit.

In some embodiments, the computer readable storage medium 404 is an electronic, magnetic, optical, electromagnetic, infrared, and/or a semiconductor system (or apparatus or device). For example, the computer readable storage medium 404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 404 stores the computer program code 406 configured to cause system 400 to perform method 100. In some embodiments, the storage medium 404 also stores information needed for performing a method 100 as well as information generated during performing the method 100, such as an activity counter parameter 416, a weighting factor parameter 418, an IP block parameter 420, a power consumption results parameter 422 and/or a set of executable instructions to perform the operation of method 100.

In some embodiments, the storage medium 404 stores instructions 407 for interfacing with manufacturing machines. The instructions 407 enable processor 402 to generate manufacturing instructions readable by the manufacturing machines to effectively implement method 100 during a manufacturing process.

System 400 includes I/O interface 410. I/O interface 410 is coupled to external circuitry. In some embodiments, I/O interface 410 includes a keyboard, keypad, mouse, trackball, trackpad, and/or cursor direction keys for communicating information and commands to processor 402.

System 400 also includes network interface 412 coupled to the processor 402. Network interface 412 allows system 400 to communicate with network 414, to which one or more other computer systems are connected. Network interface 412 includes wireless network interfaces such as BLUETOOTH, WIFI, WIMAX, GPRS, or WCDMA; or wired network interface such as ETHERNET, USB, or IEEE-1394. In some embodiments, method 100 is implemented in two or more systems 400, and information such as IP blocks, weighting factors, activity counters or power consumption results is exchanged between different systems 400 via network 414.

System 400 is configured to receive information related to a SOC design through I/O interface 410 or network interface 412. The information is transferred to processor 402 via bus 408 to determine a number, location and associated IP block for activity counters in the SOC design. The activity counter information is then stored in computer readable medium 404 as activity counter parameter 416. System 400 is configured to receive information related to weighting factors through I/O interface 410 or network interface 412. In some embodiments, information related to the weighting factors is determined by system 400 during execution of method 100 (FIG. 1). The information is stored in computer readable medium 404 as weighting factor parameter 418. System 400 is configured to receive information related to IP blocks through I/O interface 410 or network interface 412. In some embodiments, the information on IP blocks is extracted from a cell library containing standard cells. In some embodiments, the information on IP blocks is extracted from a file provided by the designer of the SOC. The information is stored in computer readable medium 404 as IP blocks parameter 420. System 400 is configured to receive information related to power consumption results through I/O interface 410 or network interface 412. In some embodiments, the information related to power consumption results is obtained by system 400 during execution of method 100. The information is stored in computer readable medium 404 as power consumption results parameter 422.

During operation, processor 402 executes a set of instructions to determine a power consumption for the SOC design provided to system 400. During operation, processor interacts with computer readable medium 404 to retrieve data and store data generated during execution of method 100.

Figure 5:
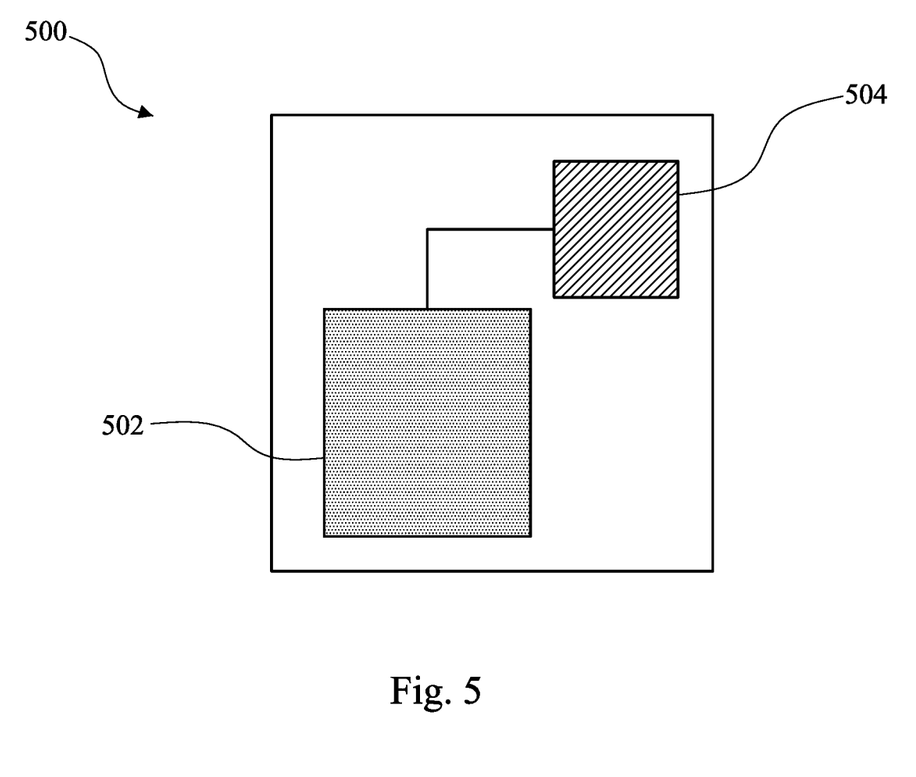
FIG. 5 is a diagram of a device including an SOC and a battery in accordance with some embodiments.

FIG. 5 is a diagram of a device 500 including an SOC 502 and a battery 504 in accordance with some embodiments. Device 500 includes SOC 502 electrically connected to battery 504. Battery 504 provides power for SOC 502 to execute a desired function. In some embodiments, a design of SOC 502 is generated using method 100 (FIG. 1). In some embodiments, a storage capacity of battery 504 is selected based on a power consumption estimation determined using method 100.

One aspect of this description relates to a method of estimating power consumption for a system on chip (SOC). The method includes simulating operation of a first sub-block of the SOC to obtain power consumption information for the first sub-block. The power consumption information for the first sub-block includes first activation information for a first intellectual property (IP) block located in the first sub-block. The method further includes simulating operation of a second sub-block of the SOC to obtain power consumption information for the second sub-block. The power consumption information for the second sub-block includes second activation information for the first IP block and activation information for a plurality of second IP blocks located in the second sub-block. The method further includes determining a weighting factor for each of the first activation information for the first IP block, the second activation information for the first IP block and the activation information for each second IP block of the plurality of second IP blocks. The method further includes estimating power consumption for the SOC based on the first activation information for the first IP block, the second activation information for the first IP block, the activation information for at least one second IP block of the plurality of second IP blocks, and corresponding weighting factors.

Another aspect of this description relates to a method of estimating power consumption for a system on chip (SOC). The method includes simulating operation of a first sub-block of the SOC to obtain power consumption information for the first sub-block. The power consumption information for the first sub-block includes first activation information for a first intellectual property (IP) block located in the first sub-block. The method further includes simulating operation of a second sub-block of the SOC to obtain power consumption information for the second sub-block. The power consumption information for the second sub-block includes second activation information for the first IP block and first activation information for a plurality of second IP blocks located in the second sub-block. The power consumption information for the first sub-block further includes second activation information for the plurality of second IP blocks. The method further includes determining an weighting factor for each of the first activation information for the first IP block, the second activation information for the first IP block, the first activation information for each second IP block of the plurality of second IP blocks and the second activation information for each second IP block of the plurality of second IP blocks. The method further includes pruning IP blocks having a weighting factor below a threshold value from the first IP block and the plurality of second IP blocks to determine a group of remaining IP blocks. The method further includes estimating power consumption for the SOC based on the group of remaining IP blocks and corresponding weighting factors.

Still another aspect of this description relates to a system for estimating power consumption for a system on chip (SOC). The system includes at least one processor; and a computer readable medium connected to the at least one processor. The at least one processor is configured to execute instructions stored on the computer readable medium to simulate operation of a first sub-block of the SOC to obtain power consumption information for the first sub-block. The power consumption information for the first sub-block includes first activation information for a first intellectual property (IP) block located in the first sub-block. The at least one processor is further configured to simulate operation of a second sub-block of the SOC to obtain power consumption information for the second sub-block. The power consumption information for the second sub-block includes second activation information for the first IP block and activation information for a plurality of second IP blocks located in the second sub-block. The at least one processor is further configured to determine an weighting factor for each of the first activation information for the first IP block, the second activation information for the first IP block and the activation information for each second IP block of the plurality of second IP blocks. The at least one processor is further configured to estimate power consumption for the SOC based on the first activation information for the first IP block, the second activation information for the first IP block, the activation information for at least one second IP block of the plurality of second IP blocks, and corresponding weighting factors.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of estimating power consumption for a system on chip (SOC), the method comprising:
   simulating operation of a first sub-block of the SOC to obtain power consumption information for the first sub-block, wherein the power consumption information for the first sub-block includes first activation information for a first intellectual property (IP) block located in the first sub-block;
   simulating operation of a second sub-block of the SOC to obtain power consumption information for the second sub-block, wherein the power consumption information for the second sub-block includes second activation information for the first IP block and activation information for a plurality of second IP blocks located in the second sub-block;
   determining a weighting factor for each of the first activation information for the first IP block, the second activation information for the first IP block and the activation information for each second IP block of the plurality of second IP blocks; and
   estimating power consumption for the SOC based on the first activation information for the first IP block, the second activation information for the first IP block, the activation information for at least one second IP block of the plurality of second IP blocks, and corresponding weighting factors;
   generating a layout of the SOC in response to the power consumption estimation satisfying a power budget for the SOC; and
   manufacturing the SOC based on the layout.

2. The method of claim 1, further comprising pruning one or more second IP blocks from the plurality of second IP blocks to determine the at least one second IP block.

3. The method of claim 2, wherein pruning the one or more second IP blocks comprises pruning the one or more second IP blocks based on a weighting factor associated with each second IP block of the plurality of second IP blocks.

4. The method of claim 2, wherein pruning the one or more second IP blocks comprises pruning second IP blocks having a weighting factor below a threshold value.

5. The method of claim 4, wherein pruning the one or more second IP blocks comprises selecting the threshold value based on a predetermined error value during estimating the power consumption of the SOC.

6. The method of claim 1, further comprising ranking the first IP block and each second IP block of the plurality of second IP blocks based on corresponding weighting factors.

7. The method of claim 1, further comprising comparing the estimated power consumption of the SOC with a power budget.

8. The method of claim 7, further comprising revising a design of the SOC if the estimated power consumption of the SOC fails to satisfy the power budget.

9. The method of claim 8, further comprising:
   ranking the first IP block and each second IP block of the plurality of second IP blocks based on corresponding weighting factors; and
   revising the design of the SOC based on the ranking of the first IP block and each second IP block of the plurality of second IP blocks.

10. The method of claim 1, further comprising estimating a power consumption of the second sub-block based on the second activation information of the first IP block, the activation information for each second IP block of the plurality of second IP blocks and corresponding weighting factors.

11. The method of claim 1, wherein estimating the power consumption of the SOC occurs prior to estimating the power consumption of the second sub-block.

12. The method of claim 11, wherein estimating the power consumption of the SOC occurs simultaneously with estimating the power consumption of the second sub-block.

13. A method of estimating power consumption for a system on chip (SOC), the method comprising:
  simulating operation of a first sub-block of the SOC to obtain power consumption information for the first sub-block, wherein the power consumption information for the first sub-block includes first activation information for a first intellectual property (IP) block located in the first sub-block;
  simulating operation of a second sub-block of the SOC to obtain power consumption information for the second sub-block, wherein the power consumption information for the second sub-block includes second activation information for the first IP block and first activation information for a plurality of second IP blocks located in the second sub-block, and the power consumption information for the first sub-block further includes second activation information for the plurality of second IP blocks;
  determining a weighting factor for each of the first activation information for the first IP block, the second activation information for the first IP block, the first activation information for each second IP block of the plurality of second IP blocks and the second activation information for each second IP block of the plurality of second IP blocks;
  pruning IP blocks having a weighting factor below a threshold value from the first IP block and the plurality of second IP blocks to determine a group of remaining IP blocks;
  estimating power consumption for the SOC based on the group of remaining IP blocks and corresponding weighting factors, wherein the estimated power consumption comprises a summation of a product of each of the group of remaining IP blocks and corresponding weighting factors;
  generating a layout of the SOC in response to the power consumption estimation satisfying a power budget for the SOC; and
  manufacturing the SOC based on the layout.

14. The method of claim 13, further comprising comparing the estimated power consumption for the SOC with a power budget.

15. The method of claim 14, further comprising revising a design of the SOC if the estimated power consumption for the SOC fails to satisfy the power budget.

16. The method of claim 15, wherein revising the design of the SOC comprises revising the design of an IP block within the group of remaining IP blocks.

17. The method of claim 13, further comprising:
  estimating a power consumption for the first sub-block based on the first activation information for the first IP block, the second activation information for the plurality of second IP blocks, and corresponding weighting factors; and
  estimating a power consumption for the second sub-block based on the second activation information for the first IP block, the first activation information for the plurality of second IP blocks, and corresponding weighting factors.

18. The method of claim 17, wherein estimating the power consumption of the SOC occurs prior to at least one of estimating the power consumption for the first sub-block or estimating the power consumption for the second sub-block.

19. A system for estimating power consumption for a system on chip (SOC), the system comprising:
  at least one processor; and
  a computer readable medium connected to the at least one processor, wherein the at least one processor is configured to execute instructions stored on the computer readable medium to:
    simulate operation of a first sub-block of the SOC to obtain power consumption information for the first sub-block, wherein the power consumption information for the first sub-block includes first activation information for a first intellectual property (IP) block located in the first sub-block;
    simulate operation of a second sub-block of the SOC to obtain power consumption information for the second sub-block, wherein the power consumption information for the second sub-block includes second activation information for the first IP block and activation information for a plurality of second IP blocks located in the second sub-block;
    determine a weighting factor for each of the first activation information for the first IP block, the second activation information for the first IP block and the activation information for each second IP block of the plurality of second IP blocks;
    estimate power consumption for the SOC based on the first activation information for the first IP block, the second activation information for the first IP block, the activation information for at least one second IP block of the plurality of second IP blocks, and corresponding weighting factors;
    generating a layout of the SOC in response to the power consumption estimation satisfying a power budget for the SOC; and
    manufacturing the SOC based on the layout.

20. The system of claim 19, wherein the processor is further configured to execute instructions on the computer readable medium to:
  estimate power consumption for the second sub-block based on the second activation information for the first IP block, the activation information for the at least one second IP block of the plurality of second IP blocks, and corresponding weighting factors, wherein the processor is configured to estimate the power consumption for the SOC prior to estimating the power consumption for the second sub-block.

* * * * *